US011238558B2

(12) United States Patent
Burleigh et al.

(10) Patent No.: US 11,238,558 B2
(45) Date of Patent: Feb. 1, 2022

(54) METHOD FOR GENERATING AND MODIFYING IMAGES OF A 3D SCENE

(71) Applicant: FOVO TECHNOLOGY LIMITED, Cardiff (GB)

(72) Inventors: Alistair Burleigh, Cardiff (GB); Robert Pepperell, Cardiff (GB)

(73) Assignee: FOVO TECHNOLOGY LIMITED, Cardiff (GB)

( * ) Notice: Subject to any disclaimer, the term of this patent is extended or adjusted under 35 U.S.C. 154(b) by 0 days.

(21) Appl. No.: 16/645,201

(22) PCT Filed: Aug. 23, 2018

(86) PCT No.: PCT/GB2018/052395
§ 371 (c)(1),
(2) Date: Mar. 6, 2020

(87) PCT Pub. No.: WO2019/048825
PCT Pub. Date: Mar. 14, 2019

(65) Prior Publication Data
US 2020/0265548 A1 Aug. 20, 2020

(30) Foreign Application Priority Data

Sep. 6, 2017 (GB) ...................................... 1714352

(51) Int. Cl.
*G06T 15/00* (2011.01)
*G06T 3/00* (2006.01)
(52) U.S. Cl.
CPC .......... *G06T 3/0006* (2013.01); *G06T 15/005* (2013.01); *G06T 2200/04* (2013.01)
(58) Field of Classification Search
CPC . G06T 15/005; G06T 3/0006; G06T 2200/04; G06T 15/00
(Continued)

(56) References Cited

U.S. PATENT DOCUMENTS

2008/0136912 A1    6/2008 Iwano

FOREIGN PATENT DOCUMENTS

GB    2554925 A    4/2018
WO    2014/122477 A1    8/2014

OTHER PUBLICATIONS

Yang Y, Jin S, Liu R, Bing Kang S, Yu J. Automatic 3d indoor scene modeling from single panorama. InProceedings of the IEEE Conference on Computer Vision and Pattern Recognition 2018 (pp. 3926-3934).*

(Continued)

*Primary Examiner* — Phu K Nguyen
(74) *Attorney, Agent, or Firm* — Polsinelli PC

(57) ABSTRACT

A method of generating and modifying a 2D image of a 3D scene the method including the steps: processing an image of a 3D scene to generate a set of data points representative of the 3D scene and 3D objects within the scene; retrieving one or more data points from the set of data; transforming the one or more data points according to one or more mathematical conversion functions, including; a function defining a projection trajectory for each data point; a function defining a geometry of a projection surface for each data point; a function defining a projection volume for each data point; a function defining an angle of projection of each data point with respect to a convergence point on a projection surface; a function defining the size to distance ratio of each data point from a projection surface; generating a transformed set of data points; projecting the transformed set of data points representative of a modified 2D image of the 3D scene; and, rendering the projected transformed set of data points into a 2D image on a display.

18 Claims, 9 Drawing Sheets

(58) Field of Classification Search
USPC .......................................................... 345/418
See application file for complete search history.

(56) References Cited

OTHER PUBLICATIONS

Zou C, Su JW, Peng CH, Colburn A, Shan Q, Wonka P, Chu HK, Hoiem D. 3D Manhattan Room Layout Reconstruction from a Single 360 Image. arXiv preprint arXiv:1910.04099. Oct. 9, 2019.*
Semmo, Amir. "Design and implementation of non-photorealistic rendering techniques for 3D geospatial data." PhD diss., Universität Potsdam, 2016.*
Degener, P. and Klein, R., 2009. A variational approach for automatic generation of panoramic maps. ACM Trans. Graph., 28(1), pp. 2-1.*
Lorenz H, Trapp M, Döllner J, Jobst M. Interactive multi-perspective views of virtual 3D landscape and city models. InThe European Information Society 2008 (pp. 301-321). Springer, Berlin, Heidelberg.*
Caumon, G., et al., "Surface-Based 3D Modeling of Geological Structures," Mathematical Geosciences, vol. 41, No. 8, pp. 927-945 (Sep. 23, 2009).
Coleman, P., et al., "Ryan: Rendering Your Animation Nonlinearly Projected," Proceedings NPAR 2004. 3rd International Symposium on Non-Photorealistic Animation and Rendering, Annecy, France, Jun. 7-9, 2004, pp. 129-156 (Jun. 7, 2004).
Jenny, H., et al., "Interactive Design of 3D Maps with Progressive Projection," The Cartographic Journal, vol. 47, No. 3, pp. 211-221 (Aug. 2010).
Falk, M., et al., "Panorama Maps with Non-Linear Ray Tracing," Computer Graphics and Interactive Techniquest in Australia and Southwest Asia, ACM, pp. 9-16 (Dec. 1, 2007).
International Search Report of PCT/GB2018/052395 dated Oct. 23, 2018.
Written Opinion of PCT/GB2018/052395 dated Oct. 23, 2018.
Search Report of Great Britain Patent Application No. 1714352.0 dated Jul. 23, 2018.

* cited by examiner

METHOD FOR GENERATING AND MODIFYING IMAGES OF A 3D SCENE

The present invention is directed to a method for generating and modifying a 2D image of a 3D scene. More specifically the method provides control over the layout and distribution of objects and space in the scene.

Images of actual or imaginary 3D scenes are increasingly being generated, stored and modified using computer graphics systems. A 3D data set representing a real physical environment may be captured with technologies including but not limited to optical cameras, optical camera arrays, image based 3D scanners, infrared scanners, photogrammetry systems, and laser scanners. A 3D data set representative of a real or imagined space can be generated using 3D modelling and design software. A 3D data set representative of an augmented or mixed reality can be created by combining measurements of real physical space with a computer-generated environment. Once captured or generated the data representing a 3D scene are typically stored in the computer system as a set of 3D coordinates with values attached to each coordinate such as a colour, texture, or mapping values. To edit or view the images, the computer system converts this 3D data into an array of pixels that are displayed on a monitor, projector, or similar device usually via a graphical processing unit.

Many existing software packages provide tools or mechanisms for modifying features of the image in order to satisfy user requirements. For example, a typical 3D computer game will offer the user control over the field of view in which the game scene is presented on the display. In this case, increasing the field of view may be required in order that more of the 3D scene is visible in the display. To give another example, a user may wish to enlarge a certain portion of the image in order to see the information within it more clearly.

However, there are a number of problems and limitations with current methods of modifying the appearance of images of three-dimensional scenes. First, conventional computer graphics systems commonly use the geometry of linear perspective to plot 3D points to a 2D image. The geometry of linear perspective imposes a strictly defined relationship between the relative sizes of objects in the scene and their distance from the virtual pinhole through which they are imaged. In brief, as objects recede in depth they diminish in size. When viewing images with a field of view of up to 50° or so horizontally this apparent diminution can appear quite natural to the viewer. But as the field of view increases towards 180°, which approximates the field of view of binocular human vision, the diminution with recession becomes more extreme, as does the apparent stretching of objects in the margins of the image. Such extreme wide-angle images are uncomfortable to view, tend to obscure central portions of the scene that are likely to interest the viewer and are generally considered to not give an accurate representation of a real life experience.

Other geometrical methods are available for rendering three-dimensional scenes in an image, including fisheye, orthographic, equirectangular or other map projections, and cylindrical projections, all of which can be currently implemented in computer graphics engines. One limitation of these methods is that they are commonly generated by deforming or re-projecting a 2D panoramic image from the form of a cubemap into other geometric projections, which involves stitching multiple perspective cameras together and is computationally very intensive. The major limitation of these projections is that they tend to produce various kinds of extreme or unnatural distortions of the objects and space being depicted, and as a result are not widely adopted in graphics engines or by consumers as again they are generally considered to not give an accurate representation of real life experience.

Once a panoramic 2D image has been either optically captured or computationally generated professional designers can employ a number of commonly used post-production software tools to arbitrarily warp and manipulate the 2D image in order to improve image layout. For example, a cinematographic special effects designer may use such a tool to resize portions of a moving image, to convert an image from one aspect ratio to another, or to produce special effects such as a specific distortion or warp to a video layer. Where such systems rely on the manipulation of captured or generated 2D image coordinates, there is a limitation to the adjustments that can be applied. The occlusion of objects in a 2D image is determined by the convergence of linear light rays through the pinhole of the camera that captured the image, meaning that it is not possible to display areas of a scene, or portions of objects in the scene, which are occluded by interposed objects. Consequently, designers are limited in the extent to which they can reformat or retarget a 2D image, or moving image, since they cannot independently modify layers of depth in the depicted scene without costly image processing.

A further limitation of many computer graphics systems is that the geometry of the images they display is not automatically modified in response to the actions of the viewer. For example, if the viewer moves closer to the screen they might expect the structure of the scene to change to allow them to see elements of the scene more clearly. Systems exist that allow viewers to reposition a device in order to simulate scanning around a 3D space or object, including virtual reality headsets, 360° videos, and structure from motion software. But such systems still use linear perspective geometry by default to display the image, and so suffer the same problems with displaying wide fields of view noted above. Also, such systems tend to rely on the user handling and moving the sensing device, whether held or by attachment to the head or body, in order to create the effect, which can feel unnatural, uncomfortable, or inconvenient.

In accordance with the present invention there is provided a method of generating and modifying a 2D image of a 3D scene the method including the steps:

processing an image of a 3D scene to generate a set of data points representative of the 3D scene and 3D objects within the scene;

retrieving one or more data points from the set of data;

transforming the one or more data points according to one or more mathematical conversion functions, selected from a group including;

a function defining a projection trajectory for each data point;

a function defining a geometry of a projection surface for each data point;

a function defining a projection volume with convergence points for each data point;

a function defining an angle of projection for each data point with respect to a convergence point on a projection surface;

a function defining a size to distance ratio for each data point from a projection surface;

generating a transformed set of data points;

projecting the transformed set of data points representative of a modified 2D image of the 3D scene; and, rendering the projected transformed set of data points into a 2D image on a display.

In an embodiment the set of data points representing the 3D scene comprises spatial coordinates, colour, texture, surface mapping data, motion data, object identification data, or other data necessary to represent a 3D scene.

In an embodiment further including the step of converting the set of data points into mathematical matrices before transforming the one or more data points.

In an embodiment the transforming function of defining a projection trajectory of each data point comprises defining the trajectory as linear or non-linear. The linear trajectories are defined in terms of single vectors and non-linear trajectories are defined in terms of multiple vectors, continuous polynomials, splines, or piecewise functions.

In an embodiment the transforming function of defining a geometry of a projection surface for each data point comprises defining the projection surface as planar or non-planar. The non-planar surface is geometrically defined using 2-dimensional polynomial functions, whether continuous or piecewise.

In an embodiment the transforming function of defining a projections volume with convergence points for each data point are defined as variables.

In an embodiment the transforming function of defining an angle of projection for each data point with respect to the projection surface or surfaces is defined as a mathematical function derived from the relationship between the position of each data point and it convergence point.

In an embodiment the transforming function of defining the size to distance ratio of each data point from a projection surface is defined as a mathematical function.

In an embodiment the functions can be applied individually or in combination to Increase or decrease the vertical field of view of the scene represented by the image ranging from any angle that is greater than 0° to any angle that is less than 360°.

In an embodiment the functions can be applied individually or in combination to increase or decrease the horizontal field of view of the scene represented by the image, ranging from any angle that is greater than 0° to any angle that is less than 360°.

In an embodiment the functions can be applied individually or in combination to increase or decrease the size of regions or objects located in the centre of the image relative to those located at the edge of the image ranging from any value that is greater than 0% to any value that is less than 1000% of actual size.

In an embodiment the functions can be applied individually or in combination to increase or decrease the size of regions or objects located in the edge of the image relative to those located at the centre of the image ranging from any value that is greater than 0% to any value that is less than 1000% of actual size.

In an embodiment the functions can be applied individually or in combination to increase or decrease the amount of vertical curvature in the image from 0, where all vertical lines that are straight in the scene appear straight in the image, to 100 where all vertical lines that are straight in the scene appear as sections of circles in the image.

In an embodiment the functions can be applied individually or in combination to increase or decrease the amount of horizontal curvature in the image from 0, where all horizontal lines that are straight in the scene appear straight in the image, to 100 where all horizontal lines that are straight in the scene appear as sections of circles in the image.

In an embodiment the functions can be applied individually or in combination to increase or decrease the amount of straightness or curvature in the image as a function of depth, from 0 where the straightness of objects or regions in the image increases with depth, to 100 where the curvature of objects or regions in the image increases with depth.

In an embodiment the functions have one or more definable parameters. The definable parameters can be set, via a user control interface or are predetermined to generate certain characteristics. The user control interface consists of a set of manually operated sliders or knobs, either mechanical or electronic in form or the user control interface consists of one or more sensors, which detect user eye motion and position, head motion and position, and body motion and position relative to alter the parameters in real time.

In an embodiment an additional display on which a linear perspective projection of the scene is presented at the same time as the modified view of the scene generated.

In an embodiment further including the step of interpolating the set of data points to construct new data points in the set before transforming the one or more data points.

The invention may be performed in various ways and embodiments thereof will now be described, by way of example only, reference being made to the accompanying drawings, in which.

Figure 1:
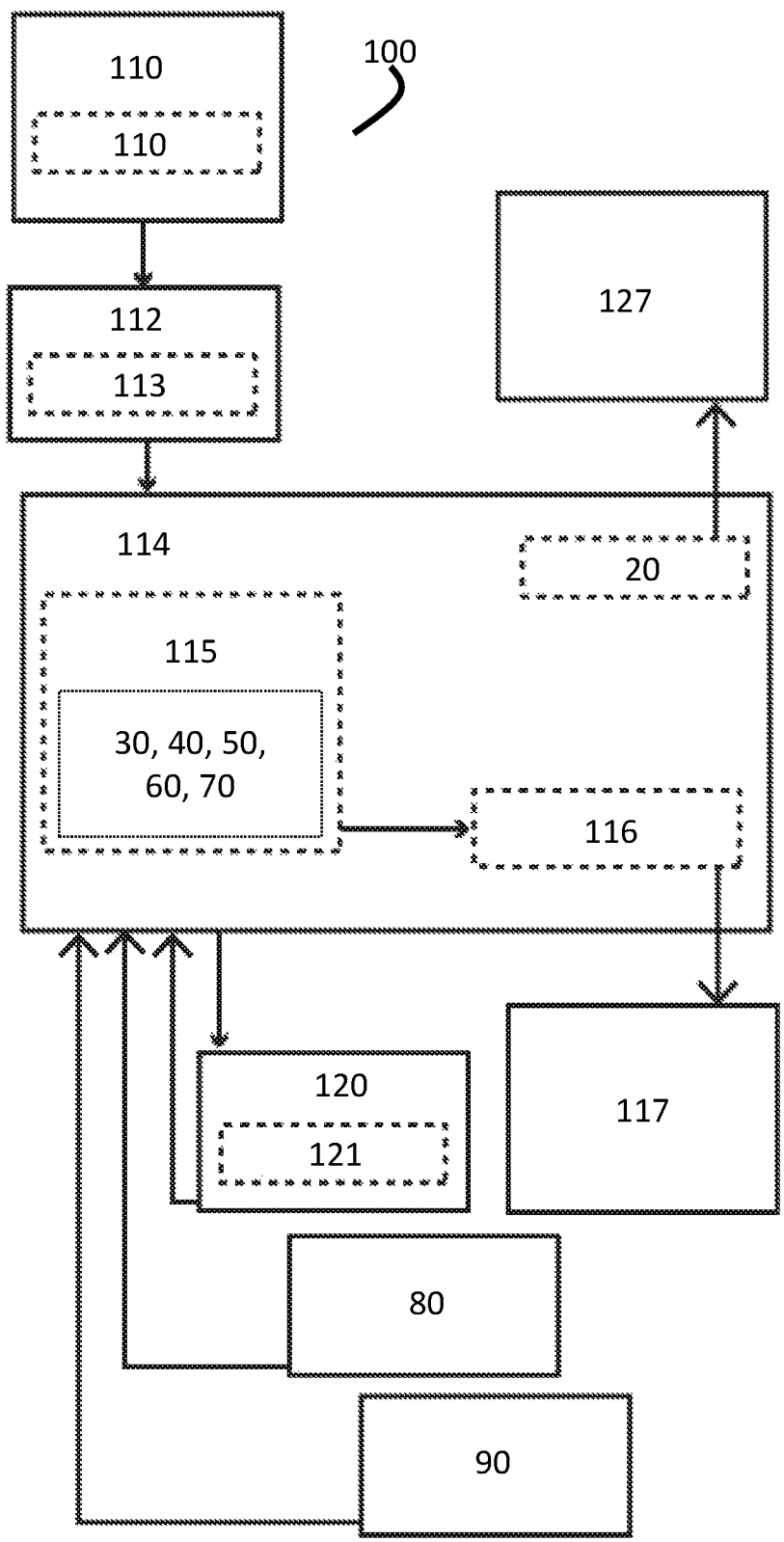
FIG. 1 is a flow chart of the present method embodied in a computer device.

Referring to FIG. 1 of the drawings, there is shown an embodiment of the present method 100. There is shown a First Memory Storage Device 110 which holds 3D data 111 representing the 3D scene and objects in the scene, which exists in the form of pixels, voxels, point coordinates, colours, texture information, or other such data required to represent the scene. Data is retrieved from the First Memory Storage Device 110 and passed to the Central Processing Unit 112 and are preferably converted into mathematical matrices 113. Using known computational techniques the matrices are instantiated within the Central Processor Unit 114 in such a way that their values can subsequently be transformed via a series of functions 115, each specified in the method. Each function 115 in the present method produces a set of 3D data points that are defined to take a path and trajectory through world space in order to intersect a projection surface (e.g. computationally modelled as light paths). The intersection points (or convergence points) forms the basis of an image to be projected 116 where the 3D data points must be flattened so that a display device can render the image in 2D, via a suitable Graphics Processing Unit 114, to a First Image Display Device 117.

The step of processing an image of a 3D scene to generate a set of data points representative of the 3D scene and 3D objects within the scene, may included: capturing the data of a 3D model such as a computer aided design (CAD) model or drawing; or, from a moving 3D scene such that may be generated in a computer game. The method may process snapshots of a model for postproduction effects or in real-time.

As an exemplary visualisation of the process of projecting/mapping a 3D image to a 2D image: the set of data points may be represented by a number of tiny metal spheres in space each with a metal interior and a Velcro surface. There is also an electromagnet at a given position in space, when the electromagnet is turned on, the metal spheres all move through space towards the electromagnet, equivalent of the projection path of the data points. There is also an umbrella around the electromagnet with the other half of the Velcro on the surface, where the balls hit the umbrella they stick, before they hit the electromagnet, equivalent to a projection surface. The umbrella can be any shape at all. The resultant 2D surface can be unwrapped onto a single planar surface in various ways, or the spheres can just then viewed orthographically (by eliminating Z), equivalent to the projection and rendering of the data points. The functions of the invention modify this generating process.

In the present method, the following transformative functions 115 are applied to the 3D data to generate or modify an image of the scene represented by the 3D data:

The projection trajectory transforming function of defining the trajectory of each data point comprises defining the trajectory (or path) as linear or non-linear. The linear paths being defined in terms of single vectors (projective geometry) while non-linear paths are defined in terms of multiple vectors, continuous polynomials, splines, or other piecewise functions 30.

The transformation function defining the geometry of the projection surface for each data point comprises defining the projection surface as planar or non-planar. The non-planar surfaces being geometrically defined using 2-dimensional polynomial functions, whether continuous or piecewise 40.

The transforming function of defining the projection surface as a volume for each data point (as opposed to a single projection surface) and the points of intersection with the path of each data point through the volume are defined as variables 50. The volume may define a number of projection surfaces within its volume with which the path of each data point may intersect at defined convergence points.

The transforming function of defining the angle of projection of each data point with respect to a convergence/intersection point on a projection surface(s) or volume is defined as a mathematical function 60.

The size to distance function of each data point (representative of a 3D object within the 3D scene) from a projections surface (volume) convergence/intersection point is defined, and expressed as a mathematical function 70.

These transformation functions can be used simultaneously or as a combination of select functions. As will be expected there is greater synergy between some functions than others. The selection can be affected by the image modification parameters 121 provided to the method and/or by inputs from the User Control Interface 80 or User Sensor Inputs 90.

It will be appreciated that defining a convergence point for a data point can also define a projection trajectory for each data point between the original position in the 3D scene and the convergence point position. The projection trajectory of the data point can then be adjusted, either by moving the convergence point, or applying an adjustment to the trajectory. The intersection point can be defined by: the projection trajectory of the data point between original position and the convergence point; and, by the shape of the intersection (projection surface) plane, shape, or volume. The projection surface or volume can be thought of as a shape defined in mathematical terms, which has an impact on both the projection trajectory and convergence point e.g. the shape defines the intersection point together with the trajectory.

The functions at there simplest are mathematical conversions. These functions 115 are transformed according to algorithmic image modification parameters 121 preconfigured for multiple types of outcomes or by a user of the device embodying the method, or in response to the data from User Control Interface 80 and Sensor Inputs 90, and rendered to the First Image Display Device 117 via an orthogonal projection.

The image modification parameters 121 can be stored as numerical data or algorithms in a Second Memory Storage Device 120 and retrieved as necessary by the GPU 114, or saved to the Second Memory Storage Device 120. The diagram shows how the User Control Interface 80 and User Sensor Inputs 90 are configured in relation to the rest of the device embodying the method. Settings from the User Control Interface 80 are passed to the Graphics Processor Unit 114 in order to modify the functions 115 specified in the present method. Settings from the User Sensor Inputs 90 are also passed to the Graphics Processor Unit 114 in order to modify the functions 115 specified in the present method 100.

Figure 2:
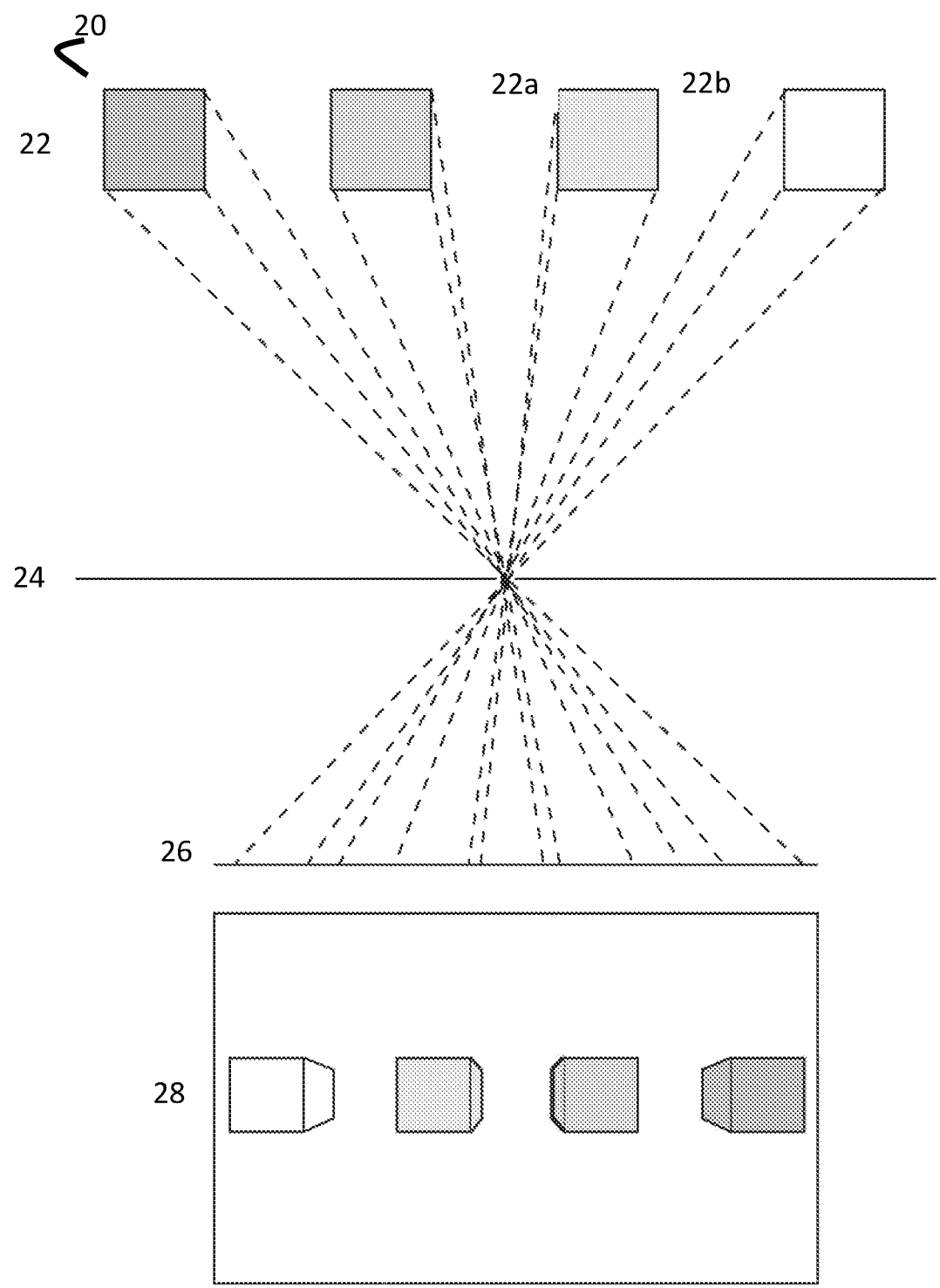
FIG. 2 is a schematic diagram of the geometry of linear perspective.

In one embodiment of the method, a further Second Image Display Device 127 shows a standard linear perspective render of the 3D data, generated by the principles 20 shown in FIG. 2.

FIG. 2 shows a schematic diagram of the basic principle of linear perspective 20. Light rays travel in straight paths, converging at a single pinhole to intersect a single plane, so forming an inverted image that is a 2D projection of the 3D scene. Note the inverted projection of the cubes 28, and the single planar surface on which the object is projected 26, subsequently rendered on the image display 28. In this method occlusions are determined by the linear trajectory of the light paths while the size of objects is a function of relative depth in the scene. For example, the vertex 22$b$ is occluded by the front faces of the cube of which it is a part, and therefore does not appear in the image 28. Furthermore, the rear face of the cube is further from the pinhole and therefore rendered as smaller than the front face.

Figure 3:
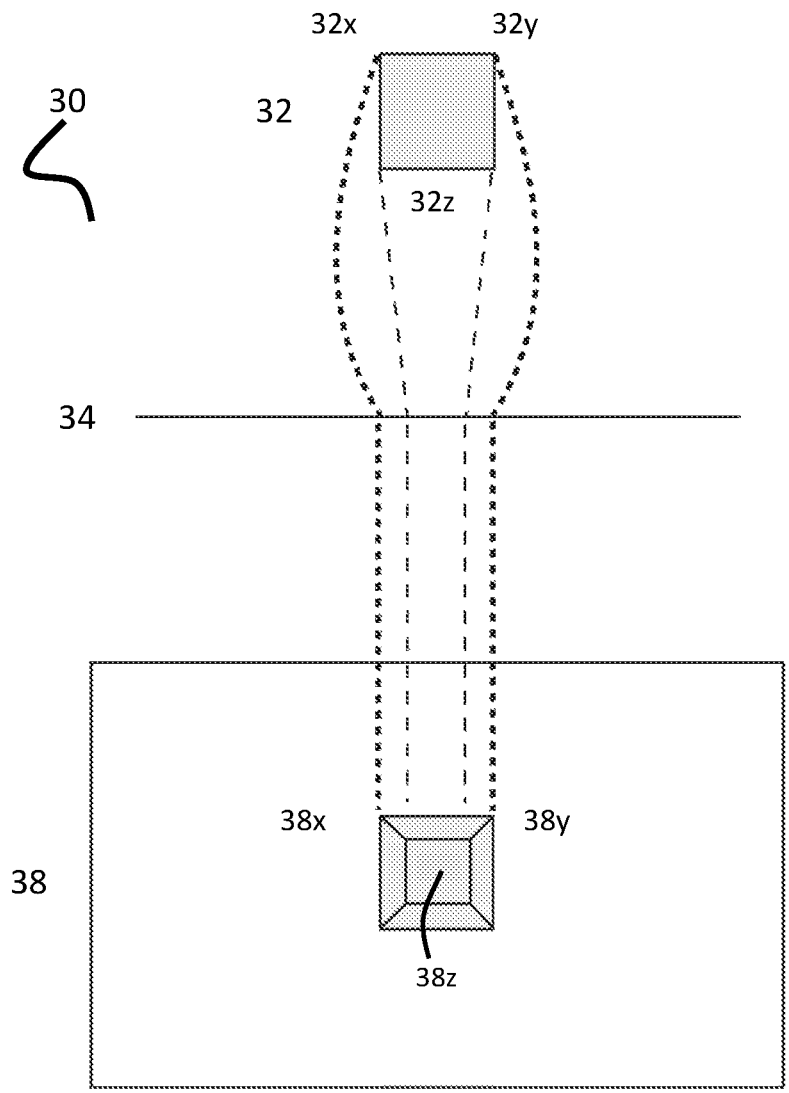
FIG. 3 is a schematic diagram of the non-linear trajectory function disclosed in the present method.

FIG. 3 is a diagram of the non-linear trajectory function 30 disclosed in the present method. In this example, data points travelling from the cube 32 towards the projection surface(s) are both straight and curved. In this method no pinhole is required, as is the case in the linear perspective method in FIG. 2, as the data points are then rendered orthographically into a 2D image from the projection surface 34. Consequently, there is no inversion of the rendered object, as in linear perspective.

Furthermore, occlusion paths can be arbitrarily modified in the present method compared to a linear perspective projection. By way of example, vertex 32$y$, which would be occluded by the front face of the cube 32$z$ in the linear perspective method is visible 38$y'$ in the present method. In this example, the effect of the method is to enlarge the rear face of the cube 32$xy$ so that it appears in the image 38$x'y'$ as larger than the front face of the cube would appear in a linear perspective projection.

As illustrated here, the present method allows for the path/trajectory of any data point to be defined, whether linear or non-linear, such that it projects the point onto the projection surface. The use of non-linear paths in the present method allows greater latitude for displaying occluded objects in the image of the 3D scene than the linear perspective method.

When embodying the present method in a device the non-linear paths as continuous polynomials, splines, or other piecewise functions, or having some other suitable geometry of curvature, or compound thereof can be predetermined. In one embodiment of the present method the form of the non-linear paths are controlled by the user via the User Control Interface 80 or User Sensor Inputs 90 via parameters programmed into the device or retrieved from the Second Memory Storage Device 120.

Figure 4:
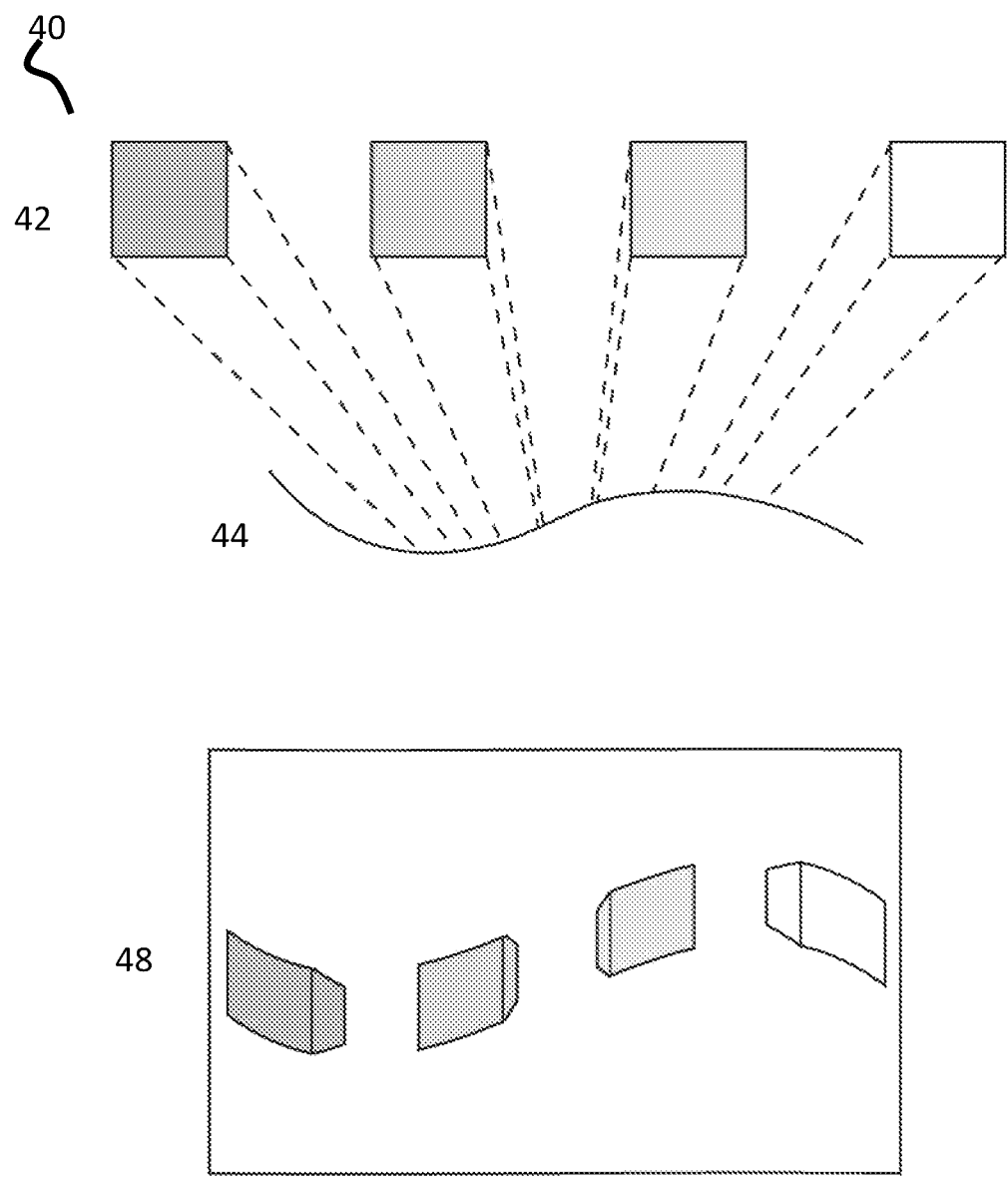
FIG. 4 is a schematic diagram of the non-planar projection surface function disclosed in the present method.

FIG. 4 illustrates the non-planar projection surface function 40 disclosed in the present method. The diagram shows a plan view of four cubes 42, a non-planar projection surface (B), and an elevated view of the resulting image 48. The non-planar projection surface 44, the form of which may be arbitrary and is shown here by way of example only, results in a modified rendering of the cubes onto the image 48 compared to the image obtained through linear perspective projection, as shown in FIG. 2. The image 48 is an orthogonal projection of the non-planar surface 44, but is scaled up in the drawing for the purposes of clarity. The purpose of this aspect of the method is to allow any user of a device embodying the method to control the appearance of a 3D scene.

When embodying the present method in a device the non-planar projection surface as continuous polynomials, splines, or other piecewise functions, or having some other suitable geometry of non-planar surfaces, or compound thereof can be predetermined. In one embodiment of the present method the form of the non-planar projection surface is controlled by the user via the User Control Interface or User Sensor Inputs via parameters programmed into the device or retrieved from the Second Memory Storage Device 120.

Figure 5:
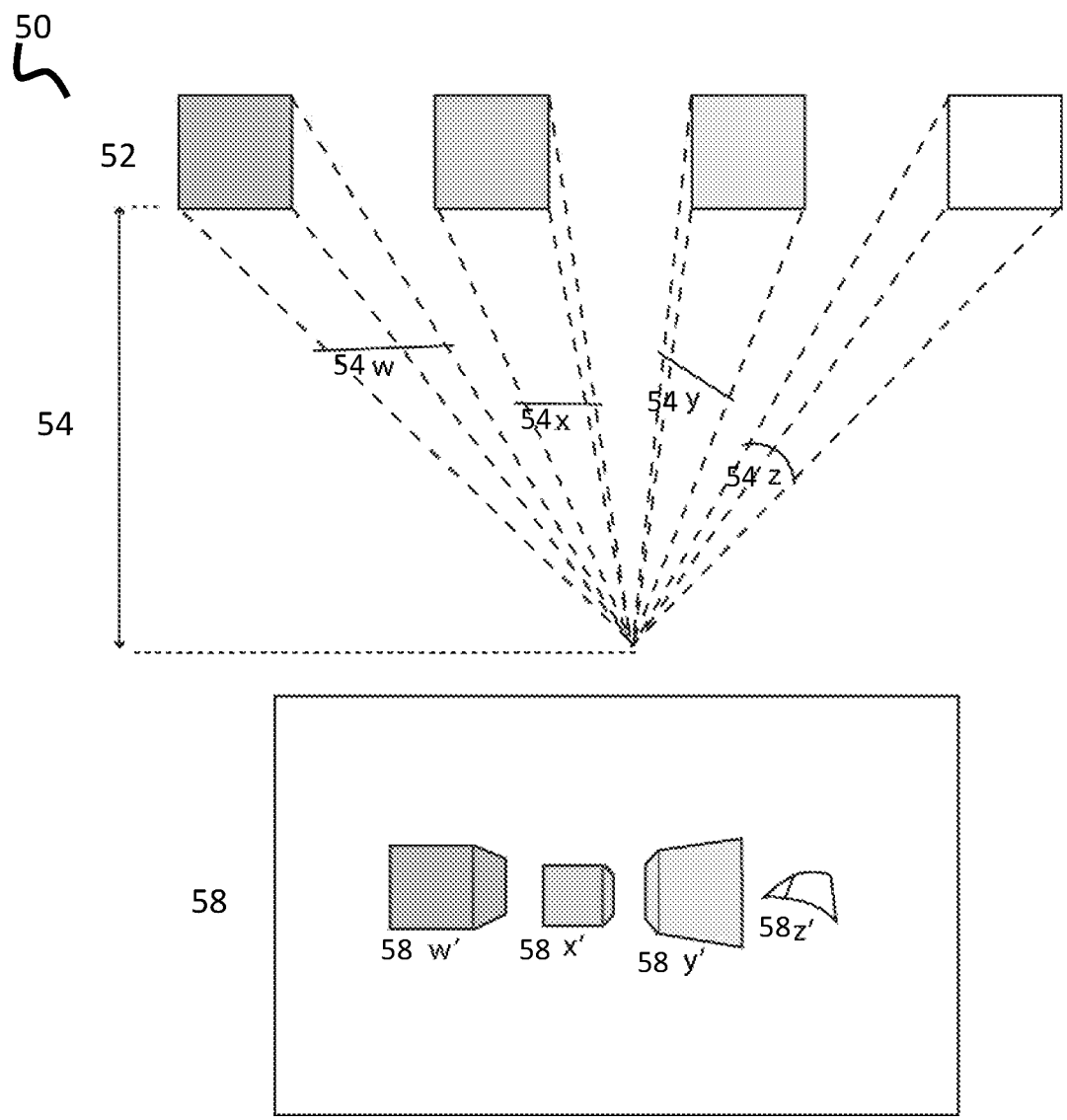
FIG. 5 is a schematic diagram of the projection volume function disclosed in the present method.

FIG. 5 illustrates the projection volume function 50 as disclosed in the present method. The diagram shows a plan view of four cubes 52, a projection volume in the region 54, and an elevated view of the resulting image 58. The path/trajectory of the example data points towards a projection volume are indicated by dotted lines. By way of illustration only, four different projection surfaces within the projection volume are shown 54$w$, 54$x$, 54$y$, and 54$z$. Each varies either in its angle with respect to the direction of the path, in its distance along the path where intersection occurs, or in its shape. The projection 52$z$, for example, is non-planar. The image of each cube will depend on the angle, location and form of each projection surface that the paths intersect with. The image 58 is rendered from an orthogonal projection of the data points paths and resultant patterns intersecting with the projection surfaces (not shown to scale), which can be located anywhere in the region 54. The purpose of this aspect of the method is to allow any user of a device embodying the method to control the appearance of independent regions or objects in a 3D scene.

When embodying the present method in a device the projection volume, number of projection surfaces, their forms and their points of intersection with the paths of each data point can be predetermined. In one embodiment of the present method the quantity, location and form of the multiple projection surfaces within the projection volume can be controlled by the user via the User Control Interface or User Sensor Inputs via parameters programmed into the device or retrieved from the Second Memory Storage Device 120.

Figure 6:
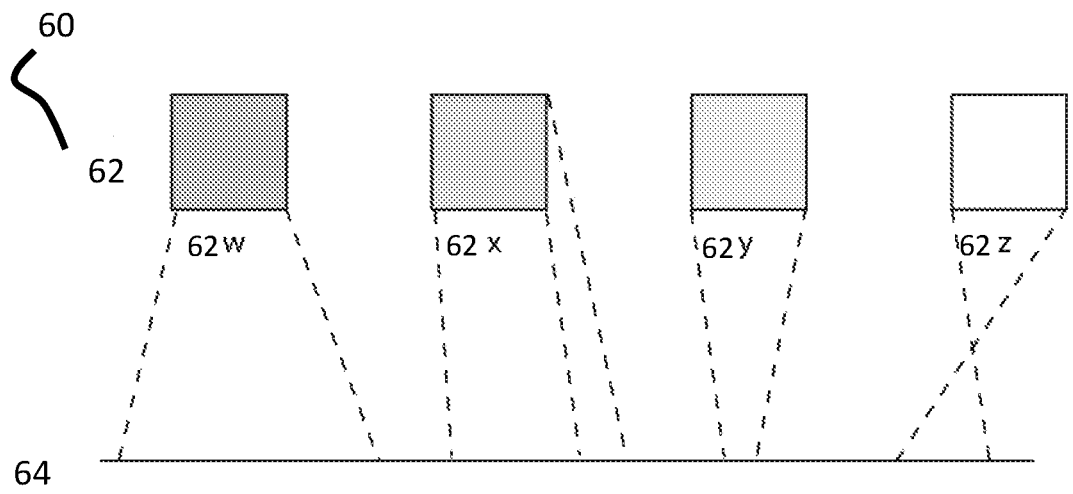
FIG. 6 is a schematic diagram of the non-convergent projection angles function disclosed in the present method.
Figure 6:
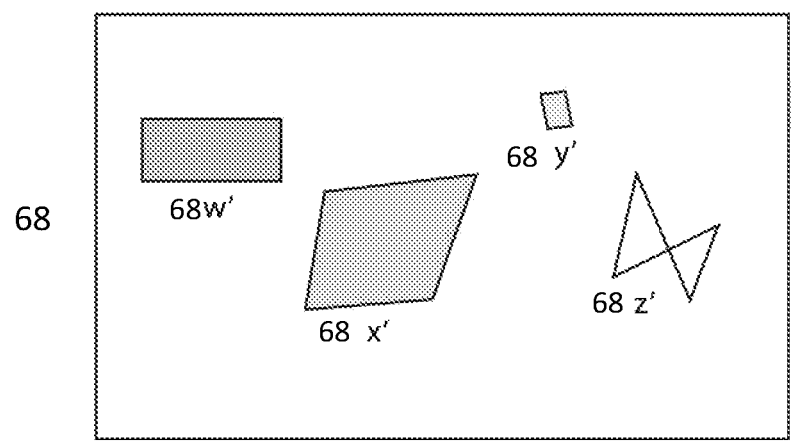

FIG. 6 illustrates the projection angle and non-convergent paths function 60 disclosed in the present method. The path of each data point representative of different sections of the cubes 62 are projected at varying non-convergent angles to the surface 64. The angles of the paths can be set arbitrarily as defined by the position of the single or multiple convergence/intersection points set globally or even individually per data point. The use of non-convergent paths in the present method permits greater latitude when rendering portions of the 3D scene to different locations in the image display than the convergent light path method inherent to linear perspective. For example, the cube 62$w$ is shown as horizontally stretched in the image 68$w'$ compared to how it would appear in the equivalent linear perspective projection, the cube 62$x$ is shown as distorted in the image 68$x'$, the cube 62$y$ is shown 68$y'$ as smaller than it would appear in a linear perspective projection, and the cube at 62$z$ is shown as twisted 68$z'$. The path of each data point where it intersects projection surface 64 creates an image that is finally rendered to the image display 68 by an orthogonal projection eliminating z (depth) from the data point positional information (not shown to scale in the drawing).

When embodying the present method in a device the angle of the paths of each data point as explicit angles, implicitly via projection matrices, or other suitable mathematical functions or geometries can be predetermined. In one embodiment of the present method the angle of the paths can be controlled by the user via the User Control Interface or User Sensor Inputs via parameters programmed into the device or retrieved from the Second Memory Storage Device 120.

Figure 7:
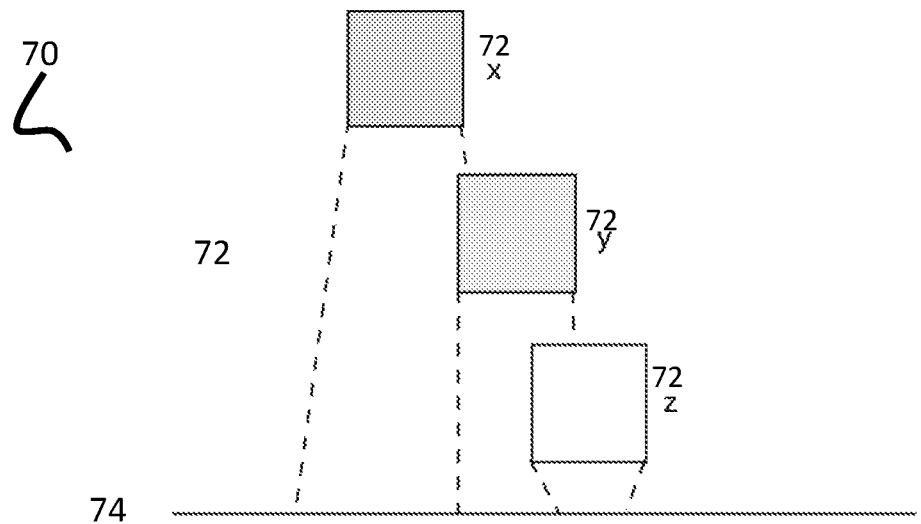
FIG. 7 is a schematic diagram of the size to distance function disclosed in the present method.
Figure 7:
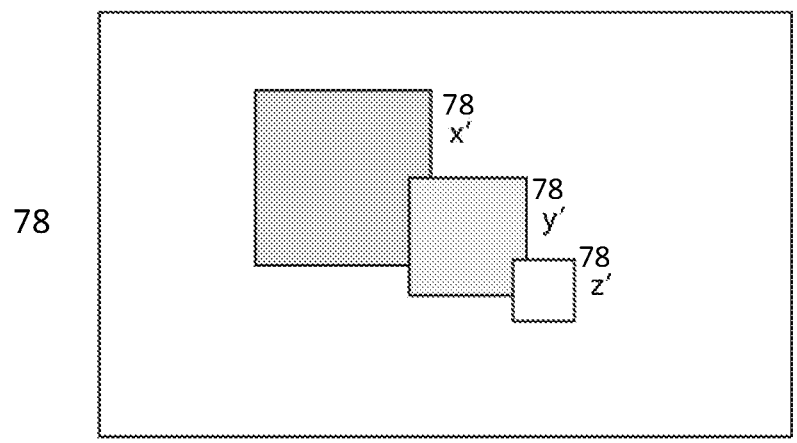

FIG. 7 illustrates the size to distance of each data point from a projection surface function 70 disclosed in the present method. Data points from different sections of the cubes 72 are projected at varying non-convergent angles to the surface 74 in such a way as to modify the relationship between size and distance inherent to linear perspective projections. The size to distance ratios can be set arbitrarily. The use of arbitrary size to distance ratios in the present method permits greater latitude when rendering portions of the 3D scene to different locations in the image display than the method inherent to linear perspective. For example, the cube 72$x$ is shown 78$x'$ as larger than the cube 78$y'$, even though it is further from the projection surface, while the cube 72$z$ is shown 78$z'$ as smaller than the cube 78$y'$, even though it is closer to the projection surface. Data points that are projected to and then intersect 74 are rendered to the image display 78 by an orthogonal projection (not shown to scale in the drawing).

When embodying the present method in a device the size to distance ratios using trigonometry, projection matrices, or other suitable geometries can be predetermined. In one embodiment of the present method the size to distance ratios can be controlled by the user via the User Control Interface or User Sensor Inputs via parameters programmed into the device or retrieved from the Second Memory Storage Device 120.

Referring now to FIGS. 3 to 7 the methods disclosed in the drawings can be applied individually or in combination to generate or modify images of 3D scenes and to control the spatial geometry of the image in order to:

Increase or decrease the vertical field of view of the scene represented by the image, ranging from any angle that is greater than 0° to any angle that is less than 360°;

Increase or decrease the horizontal field of view of the scene represented by the image, ranging from any angle that is greater than 0° to any angle that is less than 360°;

Increase or decrease the size of regions or objects located in the centre of the image relative to those located at the edge of the image ranging from any value that is greater than 0% to any value that is less than 1000% of actual size;

Increase or decrease the size of regions or objects located in the edge of the image relative to those located at the centre of the image ranging from any value that is greater than 0% to any value that is less than 1000% of actual size;

Increase or decrease the amount of vertical curvature in the image from 0, where all vertical lines that are straight in the scene appear straight in the image, to 100 where all vertical lines that are straight in the scene appear as sections of circles in the image;

Increase or decrease the amount of horizontal curvature in the image from 0, where all horizontal lines that are straight in the scene appear straight in the image, to 100 where all horizontal lines that are straight in the scene appear as sections of circles in the image; and, Increase or decrease the amount of straightness or curvature in the image as a function of depth, from 0 where the straightness of objects or regions in the image increases with depth, to 100 where the curvature of objects or regions in the image increases with depth.

Figure 8:
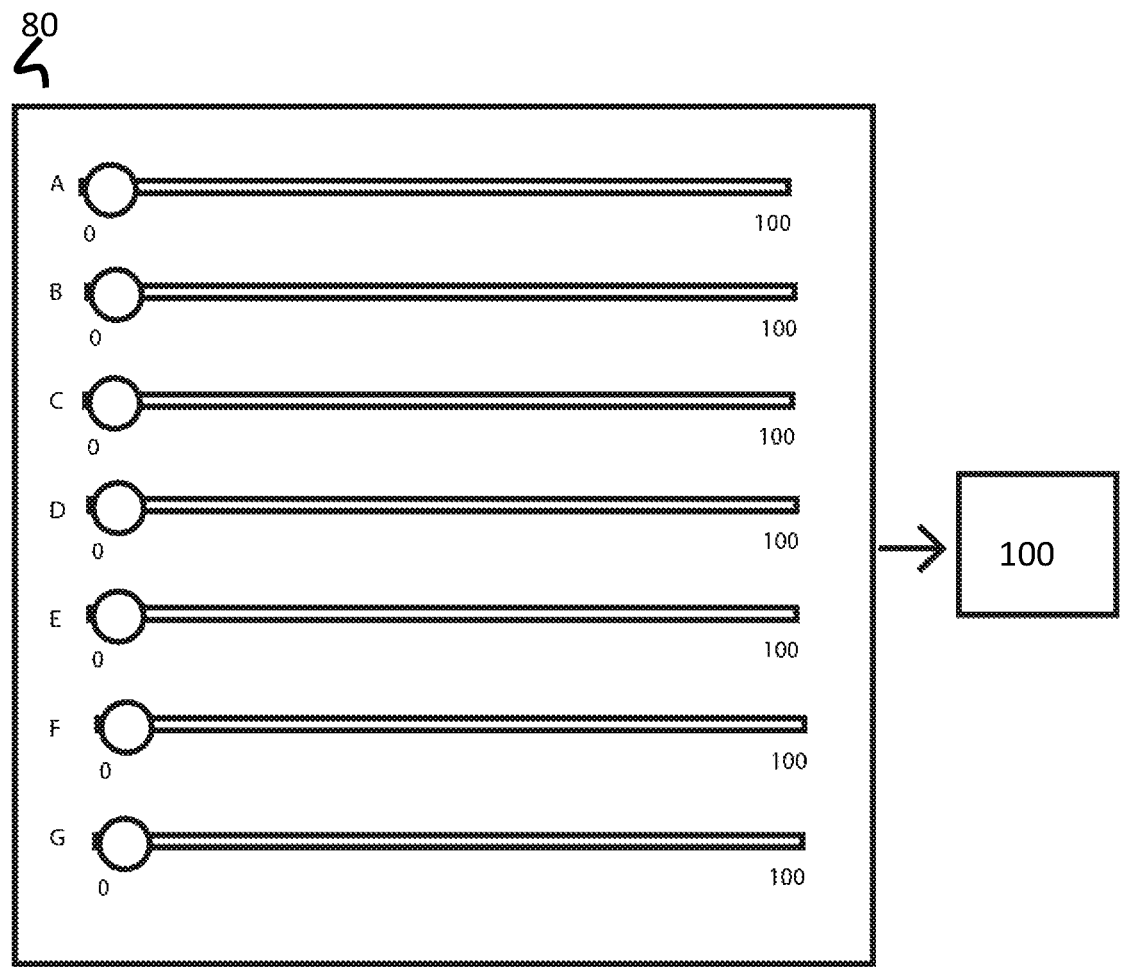
FIG. 8 is a schematic diagram of the user control interface.

FIG. 8 illustrates one embodiment of the User Control Interface 80. By way of illustration, a series of sliders are provided—from A to G—each of which can be set at a value between 0 and 100. The position of the slider determines a value that is passed to the Graphics Processing Unit 100.

In one embodiment of the method a series of control sliders are preprogrammed to modify the functions disclosed in the present method and so applied to the 3D data in order to transform its appearance in the Image Display Device, the parameters of which can be modified freely via the User Control Interface.

By way of illustration, slider A controls the amount of curvature of the projective trajectory/path of each data point in the scene using a suitable mathematical algorithm; slider B controls the number of surfaces on which each data point is projected using a suitable mathematical algorithm; slider C controls the non-planar properties of the projection surfaces using a suitable mathematical algorithm; slider D controls the convergence/intersection point position per data point and hence the angles through which the path of each data point is projected to the surface or surfaces using a suitable mathematical algorithm; slider E controls the point of intersection between the data point projection path and the projection surface or surfaces using a suitable mathematical algorithm; slider F controls the region of the scene to be modified using a suitable mathematical algorithm; slider G controls the size to distance ratio of objects in the scene using a suitable mathematical algorithm.

In a further embodiment of the method the sliders are preprogrammed to control a series of geometrical transformations of the spatial structure of the represented 3D scene using the functions and parameters defined in the method. By way of illustration, slider A controls the amount of curvature in the vertical axis of the image using a suitable mathematical algorithm, with 0 being no curvature such that all vertical lines that are straight in the scene appear straight in the image, and 100 being full curvature, such that all vertical lines in the scene appear as sections of a circle; slider B controls the amount of curvature in the horizontal axis of the image using a suitable mathematical algorithm, with 0 being no curvature such that all horizontal lines that are straight in the scene appear straight in the image, and 100 being full curvature, such that all horizontal lines in the scene appear as sections of a circle; slider C controls the vertical field of view of the image using a suitable mathematical algorithm, with 0 being 0° and 100 being 360°; slider D controls the horizontal field of view of the image using a suitable mathematical algorithm, with 0 being 0° and 100 being 360°; slider E controls the size of objects or regions of the scene at the centre of the image relative to those outside the centre using a suitable mathematical algorithm, with 0 being 1% of actual size, 50 being actual size, and 100 being 1000% of actual size; slider F controls the size of objects or regions of the scene at the outer edges of the image relative to those in the centre using a suitable mathematical algorithm, with 0 being 1% of actual size, 50 being actual size, and 100 being 1000% of actual size; slider G controls the amount of curvature or straightness in the image as a function of depth in the scene using a suitable mathematical algorithm, with 0 being increased curvature with depth and 100 being increased straightness with depth.

Figure 9:
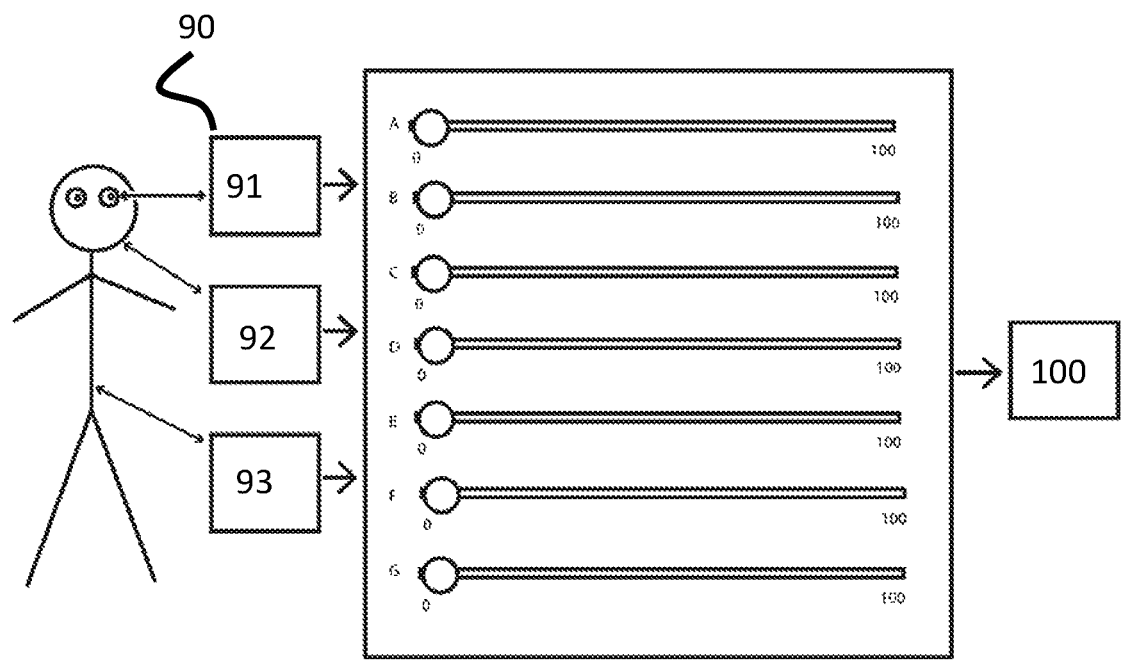
FIG. 9 is a schematic diagram of the user sensor inputs.

FIG. 9 illustrates one embodiment of the User Sensor Inputs 90. By way of illustration, a series of sliders are provided—from A to G—each of which can be set at a value between 0 and 100 according to data passed from the eye sensor 91, head sensor 92 and body position sensor 93. The position of the slider determines a value that is passed to the Graphics Processing Unit 100.

In one embodiment of the method the sliders are preprogrammed to control a series of geometrical transformations of the spatial structure of the represented 3D scene using the functions and parameters defined in the method in response to data passed from the User Sensor Inputs.

By way of illustration, slider A receives data from the Eye Position Sensor and controls the amount of curvature in the image using a suitable mathematical algorithm, with 0 being no curvature such that all lines that are straight in the scene appear straight in the image when coinciding with the user's eye position in the image, and 100 being full curvature such that all lines in the scene coinciding with the user's eye position as detected in the image appear as sections of a circle; slider B receives data from the Head Position Sensor and controls the amount of curvature in the image using a suitable mathematical algorithm, with 0 being no curvature such that all lines that are straight in the scene appear straight in the image when the user's head position is detected at 10 cm or less from the Image Display Device, and 100 being full curvature, such that all lines in the scene appear as sections of a circle when the user's head position is detected at 10 cm or less from the Image Display Device; slider C receives data from the Body Position Sensor and controls the field of view of the image using a suitable mathematical algorithm, with 0 being 50° when the body is detected at 20 cm or less from the Image Display Device and 100 being 180° when the body is detected at 20 cm or less from the Image Display Device; slider D receives data from the Eye Position Sensor and controls size to depth ratio of objects or regions in the scene, with 0 meaning objects coinciding with the user's eye position are decreased to 1% of actual size and 100 meaning objects coinciding with the user's eye position are increased to 1000% of actual size; slider E receives data from the Head Position Sensor and controls the size of objects or regions of the scene at the edge of the image relative to those at the centre using a suitable mathematical algorithm, with 0 being 1% of actual size, 50 being actual size, and 100 being 1000% of actual size.

The invention claimed is:

1. A method of generating and modifying a 2D image of a 3D scene, the method comprising:

processing an image of the 3D scene to generate a set of data points representative of the 3D scene and 3D objects within the 3D scene;

retrieving one or more data points from the set of data points;

transforming a projection path for the one or more data points according to a function defining a projection volume having a number of projection surfaces within the projection volume with convergence points for each data point;

projecting the set of data points representative of a modified 2D image of the 3D scene; and rendering the projected transformed set of data points into the 2D image on a display.

2. The method of claim 1, further comprising converting the set of data points into mathematical matrices before transforming the one or more data points.

3. The method of claim 1, further comprising transforming the one or more data points according to a function defining a projection trajectory for each data point of the one or more data points, wherein the function defining the projection trajectory for each data point comprises defining the projection trajectory as a linear trajectory or a non-linear trajectory.

4. The method of claim 3, wherein the linear trajectory is defined in terms of single vectors and the non-linear trajectory is defined in terms of multiple vectors, continuous polynomials, splines, or piecewise functions.

5. The method of claim 1, further comprising transforming the one or more data points according to a function defining a geometry of a projection surface for each data point of the one or more data points, wherein the function defining the geometry of the projection surface for each data point comprises defining the projection surface as a planar surface or a non-planar surface.

6. The method of claim 5, wherein the non-planar surface is geometrically defined using 2-dimensional polynomial functions, whether continuous or piecewise.

7. The method of claim 1, wherein the one or more mathematical conversion functions are applied individually or in combination to increase or decrease a vertical field of view of the 3D scene represented by the 2D image, ranging from a first angle that is greater than 0° to a second angle that is less than 360°.

8. The method of claim 1, wherein the one or more mathematical conversion functions are applied individually or in combination to increase or decrease a horizontal field of view of the 3D scene represented by the 2D image, ranging from a first angle that is greater than 0° to a second angle that is less than 360°.

9. The method of claim 1, wherein the one or more mathematical conversion functions are applied individually or in combination to increase or decrease a size of regions or objects located in a center of the 2D image relative to those located at an edge of the 2D image or in the edge of the 2D image relative to those located at the center, ranging from a first value that is greater than 0% to a second value that is less than 1000% of actual size.

10. The method of claim 1, wherein the one or more mathematical conversion functions are applied individually or in combination to increase or decrease an amount of vertical curvature in the 2D image from 0, wherein all vertical lines that are straight in the 3D scene appear straight in the 2D image, to 100 where all the vertical lines that are straight in the 3D scene appear as sections of circles in the 2D image.

11. The method of claim 1, wherein the one or more mathematical conversion functions are applied individually or in combination to increase or decrease an amount of horizontal curvature in the 2D image from 0, where horizontal lines that are straight in the 3D scene appear straight in the 2D image, to 100 where the horizontal lines that are straight in the 3D scene appear as sections of circles in the 2D image.

12. The method of claim 1, wherein the one or more mathematical conversion functions are applied individually or in combination to increase or decrease an amount of straightness or curvature in the 2D image as a function of depth, from 0 wherein the straightness of objects or regions in the 2D image increases with depth, to 100 where the curvature of objects or regions in the 2D image increases with depth.

13. The method of claim 1, wherein the one or more mathematical conversion functions have one or more definable parameters.

14. The method of claim 13, wherein the definable parameters are set via a user control interface.

15. The method of claim 13, wherein the definable parameters are predetermined to generate certain characteristics.

16. The method of claim 1, further comprising interpolating the set of data points to construct new data points in the set before transforming the one or more data points.

17. The method of claim 1, further comprising transforming the one or more data points according to a function defining an angle of projection for each data point of the one or more data points with respect to a convergence point on a projection surface.

18. The method of claim 1, further comprising transforming the one or more data points according to a function defining a size to distance ratio for each data point of the one or more data points from a projection surface.

* * * * *